United States Patent
Will et al.

(10) Patent No.: US 11,942,280 B2
(45) Date of Patent: Mar. 26, 2024

(54) HYBRID POLYMER ALUMINUM ELECTROLYTIC CAPACITOR AND METHOD OF MANUFACTURING A CAPACITOR

(71) Applicant: TDK Electronics AG, Munich (DE)

(72) Inventors: Norbert Will, Heidenheim (DE); László Dobai, Szeleste (HU); Péter Kerepesi, Nyergesujfalu (HU); Csaba Tóth, Ják (HU)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/482,130

(22) Filed: Sep. 22, 2021

(65) Prior Publication Data

US 2022/0013300 A1    Jan. 13, 2022

Related U.S. Application Data

(62) Division of application No. 16/467,864, filed on Jun. 7, 2019, now Pat. No. 11,158,464, which is a division
(Continued)

(30) Foreign Application Priority Data

Dec. 27, 2016   (DE) .......................... 102016125733.8

(51) Int. Cl.
*H01G 9/00*    (2006.01)
*H01G 9/012*   (2006.01)
(Continued)

(52) U.S. Cl.
CPC .......... *H01G 9/055* (2013.01); *H01G 9/0036* (2013.01); *H01G 9/012* (2013.01); *H01G 9/02* (2013.01);
(Continued)

(58) Field of Classification Search
CPC ...... H01G 9/0036; H01G 9/02; H01G 9/0425; H01G 9/045; H01G 9/055; H01G 9/145; H01G 9/151
See application file for complete search history.

(56) References Cited

U.S. PATENT DOCUMENTS 3,681,666 A    8/1972  Bowling
6,307,733 B1   10/2001 Maruyama et al.
(Continued)

FOREIGN PATENT DOCUMENTS

CN    1225495 A    8/1999
CN    1499547 A    5/2004
(Continued)

OTHER PUBLICATIONS

"Polymer capacitor," retrieved from Wikipedia on Jun. 7, 2019, https://en.wikipedia.org/wiki/Polymer_capacitor, 31 pages.
(Continued)

*Primary Examiner* — Nathan Milakovich
(74) *Attorney, Agent, or Firm* — Slater Matsil, LLP

(57) ABSTRACT

A hybrid polymer aluminum electrolytic capacitor and a method for manufacturing a capacitor are disclosed. In an embodiment a capacitor includes a first winding element having an anode foil, separators and a cathode foil which are wound around an axis and which are covered by a conductive polymer, wherein the first winding element includes a liquid electrolyte and a second winding element having an anode foil, separators and a cathode foil which are wound around an axis and which are covered by a conductive polymer, wherein the second winding element includes a liquid electrolyte, wherein each winding element has a height of more than 12 mm, wherein the first and second winding elements are arranged in a common can, wherein each winding element includes a tab connected to a respective anode foil and a tab connected to a respective cathode
(Continued)

foil, wherein the tabs connected to the anode foils are connected to each other and the tabs connected to the cathode foils are connected to each other such that the first and second winding elements are electrically connected parallel to each other, and wherein the capacitor is a hybrid polymer aluminum electrolytic capacitor.

20 Claims, 6 Drawing Sheets

Related U.S. Application Data of application No. PCT/EP2017/083574, filed on Dec. 19, 2017.

(51) Int. Cl.

| | | |
|---|---|---|
| *H01G 9/02* | (2006.01) | |
| *H01G 9/035* | (2006.01) | |
| *H01G 9/042* | (2006.01) | |
| *H01G 9/045* | (2006.01) | |
| *H01G 9/055* | (2006.01) | |
| *H01G 9/06* | (2006.01) | |
| *H01G 9/145* | (2006.01) | |
| *H01G 9/15* | (2006.01) | |

(52) U.S. Cl.
CPC ........... *H01G 9/035* (2013.01); *H01G 9/0425* (2013.01); *H01G 9/045* (2013.01); *H01G 9/06* (2013.01); *H01G 9/145* (2013.01); *H01G 9/151* (2013.01)

(56) References Cited

U.S. PATENT DOCUMENTS

| | | | |
|---|---|---|---|
| 6,307,735 B1 | 10/2001 | Saito et al. | |
| 6,310,764 B1* | 10/2001 | Will | H01G 2/106 |
| | | | 361/520 |
| 7,365,962 B2 | 4/2008 | Miura et al. | |
| 7,495,889 B2 | 2/2009 | Will | |
| 7,497,879 B2 | 3/2009 | Kakuma et al. | |
| 7,973,180 B2 | 7/2011 | Morita et al. | |
| 8,400,757 B2 | 3/2013 | Fujimoto | |
| 9,153,384 B2 | 10/2015 | Aoyama et al. | |
| 10,090,111 B2 | 10/2018 | Liu et al. | |
| 10,115,529 B2 | 10/2018 | Koseki et al. | |
| 11,158,464 B2 | 10/2021 | Will et al. | |
| 2004/0100756 A1 | 5/2004 | Koizumi et al. | |
| 2006/0120023 A1 | 6/2006 | Kobayashi et al. | |
| 2006/0176647 A1 | 8/2006 | Nitta et al. | |
| 2010/0165545 A1 | 7/2010 | Fujimoto | |
| 2011/0157778 A1 | 6/2011 | Fujimoto | |
| 2012/0236465 A1 | 9/2012 | Kondo | |
| 2016/0336117 A1 | 11/2016 | Koseki et al. | |
| 2016/0372273 A1 | 12/2016 | Kubo et al. | |
| 2017/0294273 A1* | 10/2017 | Andoralov | H01G 9/151 |
| 2018/0025846 A1 | 1/2018 | Liu et al. | |
| 2019/0006112 A1* | 1/2019 | Aoyama | H01G 9/0029 |
| 2019/0115161 A1 | 4/2019 | Will et al. | |
| 2019/0148084 A1* | 5/2019 | Hagiya | H01G 11/52 |
| | | | 361/502 |
| 2020/0251286 A1 | 8/2020 | Dobai | |
| 2021/0125789 A1 | 4/2021 | Will et al. | |

FOREIGN PATENT DOCUMENTS

| | | | | |
|---|---|---|---|---|
| CN | 1675724 | A | 9/2005 | |
| CN | 1971785 | A | 5/2007 | |
| CN | 100538943 | C | 9/2009 | |
| CN | 101783244 | A | 7/2010 | |
| CN | 101866752 | A | 10/2010 | |
| CN | 102208287 | A | 10/2011 | |
| CN | 101309949 | B | 5/2012 | |
| CN | 102683028 | A | 9/2012 | |
| CN | 102903523 | A | 1/2013 | |
| CN | 202905476 | U | 4/2013 | |
| CN | 103280320 | A | 9/2013 | |
| CN | 104637687 | A | 5/2015 | |
| CN | 105655134 | A | 6/2016 | |
| CN | 105793940 | A | 7/2016 | |
| DE | 4213651 | A1 | 10/1993 | |
| DE | 4213651 | A1 * | 10/1993 | ............... H01G 9/06 |
| DE | 10003261 | A1 | 8/2000 | |
| DE | 112004000061 | T5 | 9/2005 | |
| DE | 102016015825 | A1 | 8/2018 | |
| EP | 3104380 | A1 | 12/2016 | |
| JP | S50091635 | U | 7/1975 | |
| JP | H0385714 | A | 4/1991 | |
| JP | H0396212 | A | 4/1991 | |
| JP | H0689833 | A | 3/1994 | |
| JP | H1022177 | A | 1/1998 | |
| JP | 2001093782 | A | 4/2001 | |
| JP | 2001110681 | A | 4/2001 | |
| JP | 2001155966 | A | 6/2001 | |
| JP | 2001189242 | A | 7/2001 | |
| JP | 2001244144 | A | 9/2001 | |
| JP | 2005217008 | A | 8/2005 | |
| JP | 2006186248 | A | 7/2006 | |
| JP | 2007103705 | A | 4/2007 | |
| JP | 2007273912 | A | 10/2007 | |
| JP | 2008147541 | A | 6/2008 | |
| JP | 2011138977 | A | 7/2011 | |
| JP | 2011204724 | A | 10/2011 | |
| JP | 2014011366 | A | 1/2014 | |
| JP | 2015165550 | A | 9/2015 | |
| WO | 2016123825 | A1 | 8/2016 | |

OTHER PUBLICATIONS

Xi'an Electric, "Design and Calculation of Capacitor," Power Capacitor Research Institute, Aug. 31, 1972, 24 pages.

Zagham, "Electrolytic Capacitor," National Defense Industry Press, Xinhua Bookstore Beijing Distribution Office, Jun. 1963, 25 pages.

* cited by examiner

HYBRID POLYMER ALUMINUM ELECTROLYTIC CAPACITOR AND METHOD OF MANUFACTURING A CAPACITOR

This is a divisional application of U.S. application Ser. No. 16/467,864 entitled "Hybrid Polymer Aluminum Electrolytic Capacitor and Method of Manufacturing a Capacitor" which was filed on Jun. 7, 2019, which is a national phase filing under section 371 of international patent application no. PCT/EP2017/083574, filed Dec. 19, 2017, which claims the priority of German patent application no. 102016125733.8, filed Dec. 27, 2016, all of which is incorporated herein by reference in its entirety.

TECHNICAL FIELD

The present invention refers to a hybrid polymer aluminum electrolytic capacitor and a method of manufacturing the capacitor.

BACKGROUND

A hybrid polymer aluminum electrolytic capacitor is an electrolytic capacitor having a liquid electrolyte and a solid electrolyte of conductive polymer particles. The polymer covers an anode foil, a cathode foil, separators and tabs which electrically connect the anode foil and the cathode foil. An electrolytic capacitor is a polarized capacitor whose anode is made of aluminum on which an insulating oxide layer is formed by anodization. The oxide layer acts as the dielectric of the electrolytic capacitor. The non-solid electrolyte or the solid polymer covers the surface of the oxide layer and in principle servers as the second electrode of the capacitor.

Hybrid polymer capacitors are described, for example, in U.S. Pat. No. 6,307,735 B1 and U.S. Pat. No. 7,497,879 B2. Due to the high conductivity of the polymer layer, the equivalent series resistance (ESR) of a hybrid polymer capacitor is low and its ripple current rating can be high compared to conventional aluminum electrolytic capacitors.

So far, hybrid polymer capacitors having a diameter of more than 10 mm and a height of more than 12 mm are not available. The main reasons preventing the construction of larger hybrid polymer aluminum electrolytic capacitors are discussed in the following.

Applying the polymer material to a standard design of the winding element of the conventional aluminum electrolytic capacitor of sizes larger than 10×12 mm (diameter×height) leads to a performance reduction in terms of ESR and ripple current capability compared to a parallel connection of several small winding elements with the same total capacitance. When the foils are too big, the current has to travel over a long distance along the foils, thereby resulting in an increased metal resistance. The metal resistance of a conventional winding design is too high to fully exploit the high conductivity of the hybrid polymer electrolytic system. The metal resistance becomes the limiting part of the ESR.

Moreover, state of the art processes to impregnate the winding element with a polymer dispersion are described, for example, in U.S. Pat. No. 7,497,879 B2. These processes have a technical limitation in terms of the winding height. The polymer dispersion is sucked into the winding element by the wetting and capillary effects of the paper. However, for winding elements having a height of more than 12 mm, it is hardly possible to impregnate them completely with this technology, even by repeating the impregnation process several times.

An additional aspect that must be considered when designing a highly reliable hybrid polymer aluminum capacitor is robustness against fasting charging and discharging.

Increasing the diameter of a commonly known winding element without further design changes makes no sense because, in this case, the ESR is higher than that of a parallel connection of two small capacitors with the small total capacitance.

Increasing the height of a commonly known winding element without further process changes also make no sense due to the technical limitations of the state of the art polymer impregnation process discussed above. During the polymer impregnation, the liquid must reach, cover and penetrate every part of the winding element. This is hardly possible and definitely inefficient for a winding height of more than 12 mm when the standard process as described in U.S. Pat. No. 7,497,879 is applied. The polymer dispersion which is used in hybrid polymer capacitors is very viscous. The impregnation of windings with a length of more than 12 mm is not possible with the conventional dipping processing due to the high viscosity of the polymer dispersion. In this case, the homogeneity of the polymer dispersion inside the winding is not adequate and the middle part of the separation even remains dry. The result would be a non-proper electrical connection between the cathode foil and the anode foil.

The polymer is mostly connected to the oxide of the anode foil and the thin oxide of the cathode foil. During the voltage change of the capacitor, the polymer potential is mainly close to the cathode foil potential because the cathode oxide is very thin. On the other hand, in the hybrid polymer capacitors which are on the market, few polymer regions are only in contact with the anode foil. In this region, only the potential of the anode foil is dominating. Therefore, compensation currents are generated. If the voltage change is too fast, the caused compensating current can destroy the polymer and cause short-circuits.

SUMMARY OF THE INVENTION

Embodiments overcome the problems of the prior art which prevent the construction of a hybrid polymer aluminum electrolytic capacitor with larger dimensions.

Embodiments provide an improved capacitor.

Embodiments provide a method which enables the construction of such a capacitor.

According to a first aspect, the embodiments of the present invention concern a hybrid polymer aluminum electrolytic capacitor comprising a winding element which has a diameter of more than 10 mm. Preferably, the winding element has a height of more than 12 mm.

Further, the capacitor comprises at least two tabs which are electrically contacted with an anode foil and at least two tabs which are electrically contacted with a cathode foil. The use of at least two tabs for contacting each of the anode foil and the cathode foil may help to fully exploit a low resistance which can be provided by the polymer. AS more than one tab is used for contacting each of the anode foil and the cathode foil, a resistance of an electrical contact can be kept at a minimum.

As discussed above, a hybrid polymer aluminum electrolytic capacitor is an electrolytic capacitor having a liquid electrolyte and a solid electrolyte of conductive polymer particles. The polymer covers an anode foil, a cathode foil, separators and tabs which electrically connect the anode foil and the cathode foil. The anode foil, the cathode foil and the separator are wound to form the winding element.

Thus, the winding element may comprises an anode foil and a cathode foil that are wound around an axis with separators interposed between the anode foil and the cathode foil, wherein the anode foil, the cathode foil and the separators are covered with a conductive polymer, and wherein the capacitor comprises a liquid electrolyte.

The anode foil can comprise an aluminum foil wherein an oxide layer is arranged on the surface of the aluminum foil. The oxide layer can be generated after roughening the surface of the aluminum foil by an oxidization of the surface. The oxide layer can act as a dielectric coating film. Further, the cathode foil can also be an aluminum foil that comprises an oxide layer on its surface. The oxide layer on the cathode foil can also be formed after roughening by oxidizing the surface. The cathode foil can have a smaller thickness than the anode foil. The oxide layer on the cathode foil can be thinner than the oxide layer on the anode foil.

Each of the separators can be a paper. The separators are impregnated with the polymer. The separator can be impregnated additionally with a liquid electrolyte. In particular, the winding element can comprise two separators, each being impregnated with the polymer.

The winding element can have a cylindrical form. The height of the winding element corresponds to the height of the cylindrical form. The height can sometimes also be referred to as a length of the winding element. The diameter of the winding element can correspond to the diameter of the cylindrical form.

A winding element having a diameter of more than 10 mm and a height of more 12 mm provides the advantages of a low ESR and a high ripple current ability. As will be described later, the inventors have found a way to enable the construction of a hybrid polymer aluminum electrolytic capacitor having large dimensions.

The anode foil, the cathode foil and the separators can be covered with a conductive polymer. Moreover, tabs which electrically connect the anode foil and the cathode foil can also be covered with the conductive polymer. The cover of conductive polymer can be formed by impregnating the winding element with a polymer dispersion. The polymer dispersion may comprise a solvent and either conductive polymer particles or a powder of a conductive polymer. Additionally to the polymer, the hybrid polymer aluminum electrolytic capacitor comprises a liquid electrolyte.

The capacitor can be an axial capacitor. Hybrid polymer aluminum electrolytic capacitors that are axial capacitors result in multiple advantages. For example, multi-tab connecting is possible for an axial capacitor. In particular, multi-tab connecting is possible for an axial capacitor in a very wide range of diameters. Multi-tab connection means that at least two tabs are connected to the anode foil which enables a potential to be applied to the anode foil at two locations and at least two tabs are connected to the cathode foil which enables a potential to be applied to the cathode foil at two locations. The use of a multi-tab connection allows the length by which the current has to travel along the foil to be reduced compared to a single-tab connection wherein the potential is applied to the foils only at one location. Thereby, the resistance of the anode foil and the resistance of the cathode foil can be reduced.

Moreover, an axial capacitor provides a symmetric structure.

The anode foil and the cathode foil can be arranged and dimensioned such that, in the winding element, every part of the anode foil is covered by the cathode foil. Accordingly, the winding element may not comprise a polymer region which is adjacent only to the anode foil and not adjacent to the cathode foil. The winding element may be free from polymer regions wherein the potential of the polymer region is dominated by the potential of an anode foil. Accordingly, the occurrence of compensation currents can be prevented. The capacitor can be wound in such a manner that the polymer regions are all adjacent to the cathode foil such that the cathode foil always dominates the potential of the polymer. Accordingly, all polymer regions have the same potential, i.e., the potential of the cathode foil. Thus, no compensation current may occur in the polymer regions. The prevention of such a compensation current can help to increase the reliability and the lifetime of the capacitor. Compensating currents may destroy the polymer and cause short circuits. Thus, this problem can be avoided by preventing compensation currents.

The anode foil and the cathode foil may be arranged and dimensioned such that, in the winding element, the anode foil is embedded completely between the cathode foil on both sides.

The cathode foil may have a larger extent in the direction of the height of the winding element than the anode foil.

A number of windings of the cathode foil may be at least by one larger than a number of windings of the anode foil.

The winding element may have a spiral structure. In particular, the winding element may have a spiral structure also in hole extending through the winding element along its symmetry axis. The surface of the hole may be covered by the cathode foil. The surface of the hole may be free of the anode foil.

The cathode foil can comprise an aluminum foil covered with an oxide layer wherein the oxide layer has a homogenous thickness on the cathode foil. By avoiding an asymmetry in the thickness of the oxide layer on the cathode foil, compensation currents can also be avoided during charging and discharging of the capacitor. The thickness of the oxide layer can be considered as homogenous if a minimum thickness of the oxide layer is not thinner than 10 nm.

The winding element can be arranged inside a can having a can bottom. The can can comprise a conductive material. The cathode foil can have a larger extent in the axial direction towards the can bottom than the anode foil, wherein the cathode foil is electrically contacted with the can bottom.

This design is also referred to as an extending cathode foil. The extending cathode foil is particularly advantageous for a hybrid polymer aluminum electrolytic capacitor. In an electrolytic capacitor which does not comprise solid polymer, an extending cathode foil results in problems due to an oxidation that occurs on the extending cathode foil over the lifetime of the capacitor. However, in the hybrid polymer capacitor, the cathode foil is covered by a polymer which can prevent the oxidation. Thus, no performance reduction is generated as the oxidation of the extending cathode foil is prevented.

The can bottom can comprise a structure which mechanically impedes a movement of the winding element relative to the can bottom. The structure can comprise, for example, ribs. The structure and the extending cathode foil can be arranged and shaped such that the foil and the structure merge with each other, thereby preventing relative movement of the cathode foil relative to the can bottom.

The cathode foil can also be welded to the can bottom.

The can can comprise a corrugation which fixes the winding element. The corrugation can be an inwardly protruding part of the can.

The can can comprise a cover. The anode foil can have a larger extent in the axial direction towards the cover than the cathode foil, wherein the anode foil is electrically connected with the cover. The cover may also have a structure similar to the structure discussed above with respect to the can bottom. The anode foil and the structure on the cover can be arranged and adapted to merge with each other. A relative movement if the anode foil and the can can be prevented by the merging of the anode foil and the cover. The structure of the cover can, for example, comprise ribs. The anode foil may be welded to the cover.

The capacitor can comprise at least two tabs which are electrically contacted with the anode foil and at least two tabs which are electrically contacted with the cathode foil. This design is also known as multi-tab connecting. Multi-tab connecting is particularly simple for axial capacitors. Multi-tab connecting can provide the advantage of a reduced resistivity as a potential can be applied at multiple locations to each foil. Thereby, the metal resistance of the foil can be reduced.

The winding element may have a diameter of less than 22 mm. Preferably, the winding element has a diameter in the range of 12 mm to 17 mm. The winding element can have a height of less than 40 mm. Preferably, the winding element has a height in the range of 15 mm to 30 mm.

The ratio of the height of the winding element to the diameter may be larger than 2. This ratio results in particularly preferably electrical properties of the winding element.

According to a second aspect, embodiments of the present invention refer to a hybrid polymer aluminum electrolytic capacitor comprising a first winding element and a second winding element. The first winding element comprises an anode, separators and a cathode foil which are wound around an axis and which are covered by a conductive polymer. Additionally to the conductive polymer, the first winding element comprises a liquid electrolyte. The first winding element has a height of more than 12 mm. The second winding element comprises an anode foil, separators and a cathode foil which are wound around an axis and which are covered by a conductive polymer. Additionally to the conductive polymer, the second winding element comprises a liquid electrolyte. The second winding element has a height of more than 12 mm. The winding elements are arranged in a common can. Each winding element comprises a tab connected to its anode foil and a tab connected to its cathode foil. The tabs connected to the anode foils are connected to each other and the tabs connected to the cathode foils are connected to each other such that the winding elements are electrically connected parallel to each other. The capacitor can further comprise more than two winding elements wherein each winding element is designed in the same way as the first and the second winding element and wherein all winding elements are arranged in the common can. Each of the first winding element and the second winding element may be a radial winding element. Alternatively, each of the first winding element and the second winding element may be an axial winding element.

The capacitor may comprise more than two winding elements which are arranged in the common can and which are connected parallel to each other.

The winding elements can be manufactured with the impregnating method described below which enables a homogenous impregnating even for winding elements having a height larger than 12 mm.

According to another aspect, embodiments of the present invention concern a method of manufacturing the capacitor according to the first aspect. The method comprises the steps of: winding an anode foil, separators and a cathode foil around an axis to form a winding element, flooding the winding element with a polymer dispersion wherein the polymer dispersion contains electrically conductive solid polymer particles or polymer powder and a solvent, and applying pulses of an overpressure to the flooded winding element.

By using pulses of an overpressure the polymer dispersion can be distributed homogenously over the entire winding element. It is possible to impregnate inner parts of the winding element with this method which could previously not be reached by the impregnating.

During a pulse of the overpressure, an overpressure in the range of 2 to 150 bar can be applied followed by applying either an atmospheric pressure or a pressure of less than 1 bar. The pulses are preferably applied multiple times.

Additionally, the method may comprise the step of arranging the winding element in a can which comprises a liquid electrolyte.

According to another aspect, embodiments of the present invention concern an alternative method of manufacturing the capacitor. The method comprises the steps of: winding an anode foil, separators and a cathode foil around an axis to form a winding element, arranging the winding element in a tube, and forcing a polymer dispersion to flow through the tube and thereby through the winding element, wherein the polymer dispersion contains electrically conductive solid polymer particles or polymer powder and a solvent.

An overpressure of at least 1.5 bar can be applied when the polymer dispersion flows through the winding element. The flow-through method also ensures that the winding element of large dimensions is impregnated homogenously. Applying the overpressure further improves the flow-through method.

Additionally, the method may comprise the step of arranging the winding element in a can which comprises a liquid electrolyte.

In the following text, a set of advantageous aspects is described. The aspects are numbered to facilitate referencing features of one aspect in other aspects. Features from the aspects are not only relevant in connection with the specific aspects they relate to but are also of relevance on their own.

1. Hybrid polymer aluminum electrolytic capacitor comprising a winding element which has a diameter of more than 10 mm and a height of more than 12 mm.

2. Capacitor according to aspect 1, wherein the winding element comprises an anode foil and a cathode foil that are wound around an axis with separators interposed between the anode foil and the cathode foil, wherein the anode foil, the cathode foil and the separators are covered with a conductive polymer, and wherein the capacitor comprises a liquid electrolyte.

3. Capacitor according to one of the preceding aspects, wherein the capacitor is an axial capacitor.

4. Capacitor according to one of the preceding aspects, wherein the anode foil and the cathode foil are arranged and dimensioned such that, in the winding element, every part of the anode foil is covered by the cathode foil.

5. Capacitor according to one of the preceding aspects, wherein the cathode foil comprises an aluminum foil covered with an oxide layer, wherein the oxide layer has a homogeneous thickness on the cathode foil.

6. Capacitor according to one of the preceding aspects, wherein the winding element is arranged inside a can having a can bottom, wherein the cathode foil has a larger extend in the axial direction towards the can bottom than the anode foil and wherein the cathode foil is electrically contacted with the can bottom.

7. Capacitor according to one of the preceding aspects, wherein the can bottom comprises a structure which mechanically impedes a movement of the winding element (2) relative to the can bottom.

8. Capacitor according to one of the aspects 6 or 7, wherein the cathode foil is welded to the can bottom.

9. Capacitor according to one of the aspects 6 to 8, wherein the can comprises a corrugation which fixes the winding element.

10. Capacitor according to one of aspects 6 to 9, wherein the can comprises a cover, wherein the anode foil has a larger extend in the axial direction towards the cover than the cathode foil and wherein the anode foil is electrically contacted with the cover.

11. Capacitor according to the preceding aspect, wherein the anode foil is welded to the cover.

12. Capacitor according to one of the preceding aspects, wherein the capacitor comprises at least two tabs which are electrically contacted with anode foil and at least two tabs which are electrically contacted with the cathode foil.

13. Capacitor according to one of the preceding aspects, wherein the winding element has a diameter of less than 22 mm.

14. Capacitor according to one of the preceding aspects, wherein the ratio of the height of the winding element to the diameter of the winding element is larger than 2.

15. Hybrid polymer aluminum electrolytic capacitor, comprising a first winding element comprising an anode foil, separators and a cathode foil which are wound around an axis and which are covered by a conductive polymer, wherein the first winding element comprises a liquid electrolyte, and a second winding element comprising an anode foil, separators and a cathode foil which are wound around an axis and which are covered by a conductive polymer, wherein the second winding element comprises a liquid electrolyte, wherein each of the first winding element and the second winding element has a height of more than 12 mm, wherein the winding elements are arranged in a common can, wherein each winding element comprises a tab connected to the respective anode foil and a tab connected to the respective cathode foil, and wherein the tabs connected to the anode foils are connected to each other and the tabs connected to the cathode foils are connected to each other such that the winding elements are electrically connected parallel to each other.

16. Capacitor according to the preceding aspect, wherein each of the first winding element and the second winding element is a radial winding element, or wherein each of the first winding element and the second winding element is an axial winding element.

17. Method of manufacturing a capacitor according to one the aspects 1 to 14, comprising the steps of: winding an anode foil, separators and a cathode foil around an axis to form a winding element, flooding the winding element with a polymer dispersion, wherein the polymer dispersion contains electrically conductive solid polymer particles or polymer powder and a solvent, applying pulses of an overpressure to the flooded winding element.

18. Method according to the preceding aspect, wherein during a pulse of the overpressure, an overpressure in the range of 2 to 150 bar is applied followed by applying either an atmospheric pressure or a pressure below 1 bar.

19. Method of manufacturing a capacitor according to one the aspects 1 to 14, comprising the steps of: winding an anode foil, separators and a cathode foil around an axis to form a winding element, arranging the winding element in a tube, forcing a polymer dispersion to flow through the tube and thereby through the winding element, wherein the polymer dispersion contains electrically conductive solid polymer particles or polymer powder and a solvent.

20. Method according to the preceding aspect, wherein an overpressure of at least 1.5 bar is applied when the polymer dispersion flows through the winding element.

BRIEF DESCRIPTION OF THE DRAWINGS

In the following, the present invention is described in detail.

DETAILED DESCRIPTION OF ILLUSTRATIVE EMBODIMENTS

Figure 1:
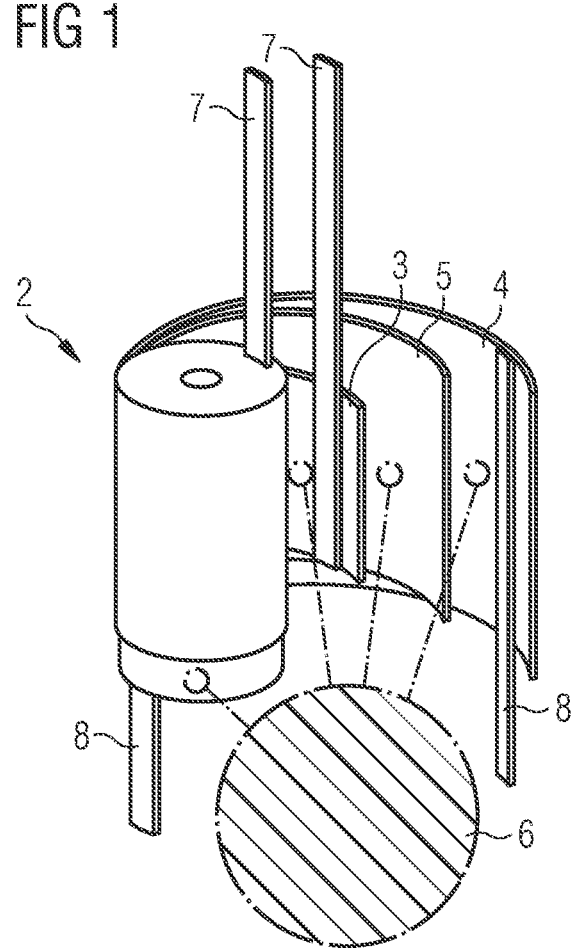
FIG. 1 shows a first embodiment of a winding element.

FIG. 1 shows a first embodiment of a winding element 2 of a hybrid polymer aluminum electrolytic capacitor 1. The winding element 2 has a diameter of more than 10 mm and a height of more than 12 mm.

The winding element 2 comprises an anode foil 3, a cathode foil 4 and a separator 5 which are wound around a common axis. The separator 5 is arranged between the anode foil 3 and the cathode foil 4. The winding element 2 further comprises another separator which is also arranged between the anode foil 3 and the cathode foil 4 and which is not shown in FIG. 1 to simplify the Figure. In particular, the anode foil 3, the separator 5, the cathode foil 4 and the other separator are stacked in this order and then wound around the axis.

The winding element 2 has been impregnated with a polymer 6. The impregnation is indicated in FIG. 1 by showing the polymer 6 that covers the anode foil 3, the cathode foil 4 and the separator 5 in an enlarged view. The polymer 6 which covers the anode foil 3, the cathode foil 4 and the separators 5 is conductive. In addition to the polymer, the capacitor 1 also comprises a liquid electrolyte.

The anode foil 3 comprises an aluminum foil. The surface of the aluminum foil has been roughened by an etching process. Then, a dielectric oxide film has been formed on the surface by an oxidation treatment. Thus, the anode foil 3 comprises aluminum foil having an oxide layer on its surface. The cathode foil 4 also comprises an aluminum foil where the surface of the aluminum foil has been roughened by an etching process and, then, a dielectric oxide film has been formed on the surface by an oxidation treatment. Thus, the cathode foil 4 also comprises aluminum foil having an oxide layer on its surface.

The anode foil 3 and the cathode foil 4 are dimensioned such that they result in a winding element 2 having a diameter of more than 10 mm and a height of more than 12 mm when being wound. Thus, the foils 3, 4 are larger and broader than the foils commonly used for hybrid polymer aluminum electrolytic capacitors.

Each of the separators 5 is a paper that has been impregnated with the polymer 6.

The common axis around which the winding element 2 is wound defines an axial direction.

The winding element 2 further comprises tabs 7, 8 which are used for electrically contacting the winding element 2. The winding element 2 comprises two tabs 7 which are both connected to the anode foil 3. The tabs 7 connected to the anode foil 3 extend in the positive axial direction. Further, the winding element 2 comprises two tabs 8 which are connected to the cathode foil 4. The tabs 8 connected to the cathode foil 4 extend in the negative axial direction, i.e., in the opposite direction to the tabs 7 connected to the anode foil 3.

Capacitors 1 having tabs 7 connected to the anode foil 3 and tabs 8 connected to the cathode foil 4 which extend in opposite directions are also known as axial capacitors. In contrast to this, in a radial capacitor, a tab connected to the anode foil and a tab connected to the cathode foil both extend in the same axial direction, i.e., both extending in the positive axial direction or both extending in the negative axial direction.

The use of multiple tabs 7, 8 for connecting each of the anode foil 3 and the cathode foil 4 allows to use long and broad foils 3, 4. The use of multiple tabs 7, 8 reduces the metal resistance of the winding element 2 as a current can be fed into winding element 2 at multiple locations, thus reducing the length which the current has to travel inside the winding element 2. The use of multiple tabs 7, 8 is not known from hybrid polymer aluminum electrolytic capacitors.

Figure 2:
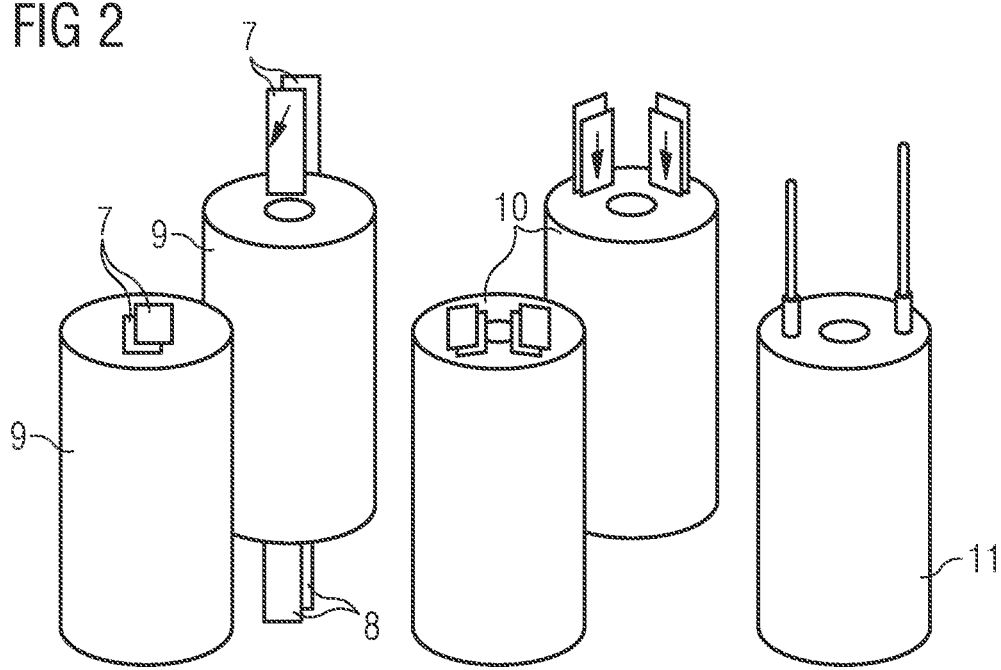
FIG. 2 shows different kinds of capacitors in a perspective view.

FIG. 2 shows different kinds of capacitors in a perspective view. In particular, FIG. 2 shows two axial capacitors 9, each having two tabs 7 extending in the positive axial direction and two tabs 8 extending in the negative axial direction. The tabs 7 extending in the positive axial direction are connected to the anode foil 3 and the tabs 8 extending in the negative axial direction are connected to the cathode foil 4. For the axial capacitor shown on the left, the two tabs 8 are not visible due to the perspective.

The winding element of the axial capacitor 9 is wound around an axis. Each of the two tabs 7 connected to the anode foil 3 is arranged in a radial distance away from this axis. In a plane perpendicular to the axis, the two tabs 7 are arranged in point symmetry with respect to the axis. Each of the two tabs 8 connected to the cathode foil 4 is arranged in a radial distance away from the axis. In a plane perpendicular to the axis, the two tabs 8 are arranged in point symmetry with respect to the axis. The axial capacitors 9 having two tabs 7, 8 connected to each of the anode foil 3 and the cathode foil 4 have a low ESR and, thus, an increased ripple current capability.

It can be gathered that constructing a capacitor having two tabs connected to each of the anode foil and the cathode foil is possible for an axial capacitor 9. FIG. 2 further shows two snap-in capacitors 10. A minimum diameter of 22 mm is required in order to enable the construction of a snap-in capacitor 10 having two tabs connected to each of the anode foil 3 and the cathode foil 4. FIG. 2 further shows a radial capacitor 11. It is not possible to construct a radial capacitor 11 having two tabs connected to each of the anode foil 3 and the cathode foil 4.

The capacitor 1 shown in FIG. 1 is arranged inside in a can which is not shown in FIG. 1. The can comprises a tubular can body, a can bottom and a cover. The can bottom and the cover are disc-shaped. In the axial direction, the tubular can body is sandwiched between the can bottom and the cover.

The cathode foil 4 has a larger extent in the axial direction towards the can bottom than the anode foil 3. The separators 5 have a smaller extent than the cathode foil 4 in the axial direction towards the can bottom. The anode foil 3 has a shorter extent in the axial direction towards the can bottom than the cathode foil 4 and the separators 5.

The extending cathode foil 4 touches the can bottom. Thus, a current can flow through a shortcut via the conductive case bottom to the cathode foil 4. The extending cathode foil 4 shown in FIG. 1 results in a reduced ESR.

This idea is known for electrolytic capacitors wherein the winding element is mechanically pressed to the can bottom so that an extending cathode foil touches the can bottom. This approach works only with low reliability and for a limited time. During operation, an oxide layer between the cathode foil and the can bottom is formed that reduces and finally interrupts the electrical connection.

However, in the hybrid polymer aluminum electrolytic capacitor 1, the cathode foil 4 is covered by polymer. The polymer cover prevents an oxidation of the cathode foil 4. Therefore, no oxide layer can grow. Moreover, the polymer is also conductive such that a current can flow from the can bottom to the cathode foil 4 via the polymer. Accordingly, no connection of two metals is required. Thus, the design shown in FIG. 1 results in a better thermal connection and a reduced ESR.

For a long term stability of the electrical connection to the can, a mechanical movement of the winding element 2 relative to the can should be prevented. Therefore, the cathode foil 4 may be fixed to the can bottom, e.g., by welding. Welding has the benefit of a low contact resistance, but has the drawback of an additional process step and, thus, additional costs.

Alternatively or additionally, the can bottom may further comprise a structure, e.g., ribs. The structure may further help to avoid any mechanical movements. The structure may be designed to fix the extending cathode foil 4. For example, the cathode foil 4 may be clamped between two adjacent ribs. The cathode foil 4 and the structure on the can bottom can be designed such that they merge with each other, thereby providing mechanical stability.

Moreover, the can may comprise a corrugation which also fixes the winding element 2 mechanically. The corrugation may be an inwardly protruding part of the can. The corrugation keeps the winding element 2 stable to the can bottom. Therefore, the current path from the can bottom to the cathode foil 4 via the polymer or via a metal connection keeps stable.

Additionally or alternatively, the anode foil 3 may be extended in the opposite direction. Accordingly, the extended anode foil 3 may touch the cover of the can. The extended anode foil 3 may be welded to the cover. This solution provides equivalent low ESR, like using a high number of tabs on the anode side.

Figure 3:
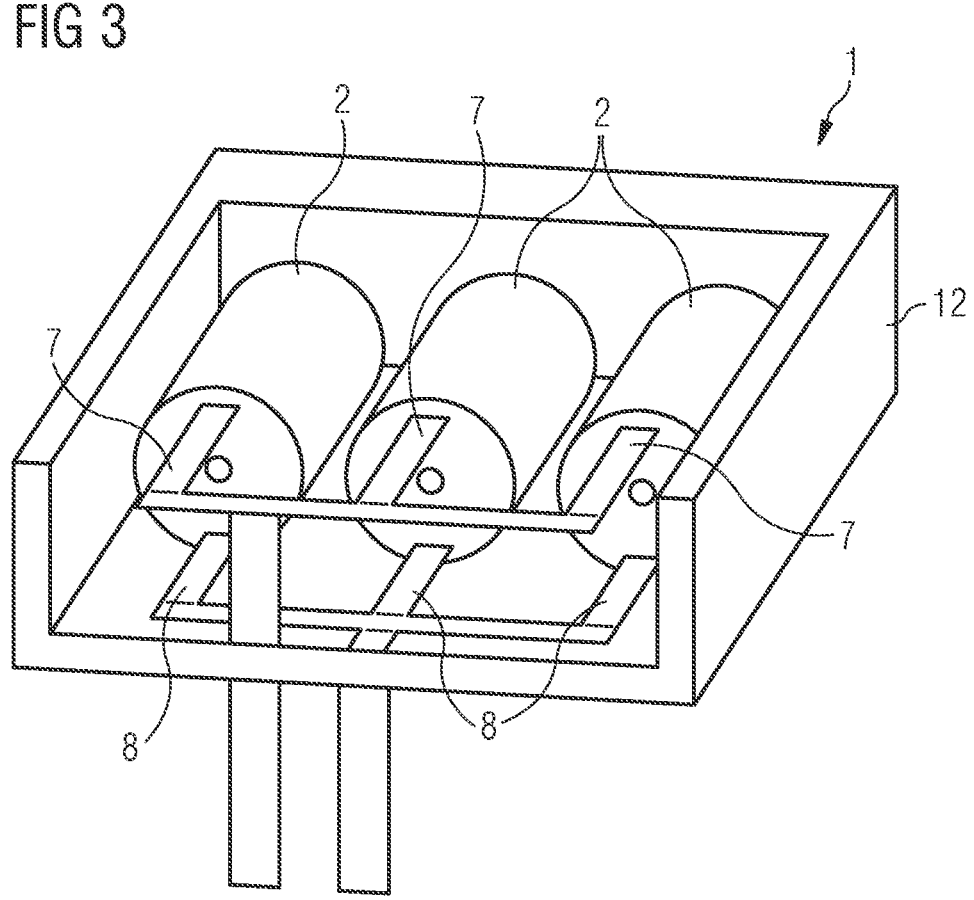
FIG. 3 shows a capacitor comprising three winding elements.

FIG. 3 shows another embodiment of a capacitor 1 which comprises three winding elements 2, each winding element 2 having a height of more than 12 mm. Each winding element is connected by two tabs 7, 8, one tab 7 connected to the anode foil 3 and one tab 8 connected to the cathode foil 4. All of the tabs 7 connected to the anode foils 3 are connected together. Moreover, all of the tabs 8 connected to the cathode foils 4 are also connected together. Thus, the winding elements 2 are electrically connected in parallel to each other. The winding elements 2 are arranged in a common can 12. All tabs 7, 8 are extracted on the same side. Thus, each of the winding element 2 is connected as a radial winding element. All of the tabs 7, 8 connected to the anode foils 3 are connected together. Moreover, all of the tabs 7, 8 connected to the cathode foils 4 are also connected together.

In an alternative design, the winding elements 2 may be formed as axial winding elements wherein the tabs 7 connected to the anode foil are extracted at one end of the winding elements 2 and the tabs 8 connected to the cathode foil are extracted at the opposite end of the winding element 2.

Figure 4:
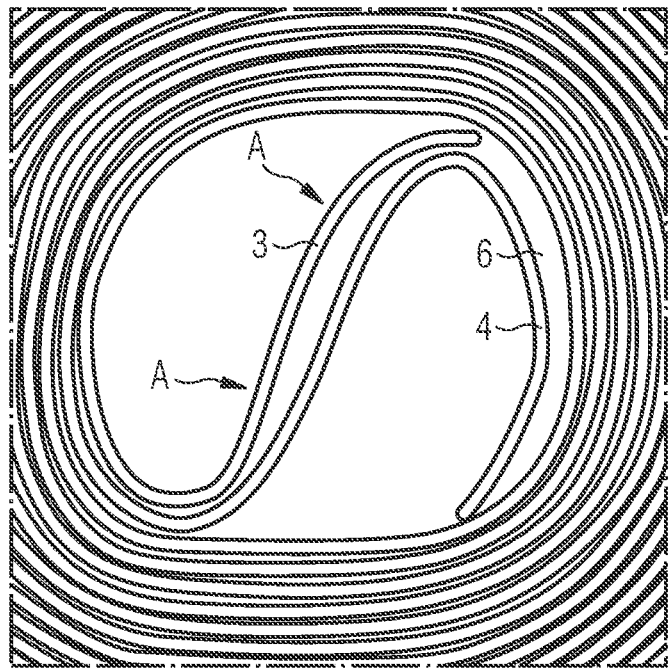
FIG. 4 shows an x-ray picture of a common polymer electrolytic capacitor.

FIG. 4 is an x-ray picture of a common polymer electrolytic capacitor. With the help of FIG. 4, a failure mechanism which has been identified will be explained.

The polymer is mostly connected with the oxide of the anode foil 3 and the oxide of the cathode foil 4. During a voltage change of the capacitor, the polymer potential is mainly close to the potential of the cathode foil potential because the oxide on the cathode foil 4 is very thin.

However, the capacitor also comprises polymer regions which are only in contact to the anode foil 3. These regions are marked by two thick arrows A in FIG. 4. In this region only the potential of the anode foil 3 is dominating. Therefore, compensation currents are generated when the capacitor is charged or discharged. Moreover, if the voltage charge is too fast, the caused compensating current can destroy the polymer and causes short circuits. As will be discussed now, the anode foil 3 and the cathode foil 4 are dimensioned and wound in such a way that compensation currents can be avoided.

Figure 5:
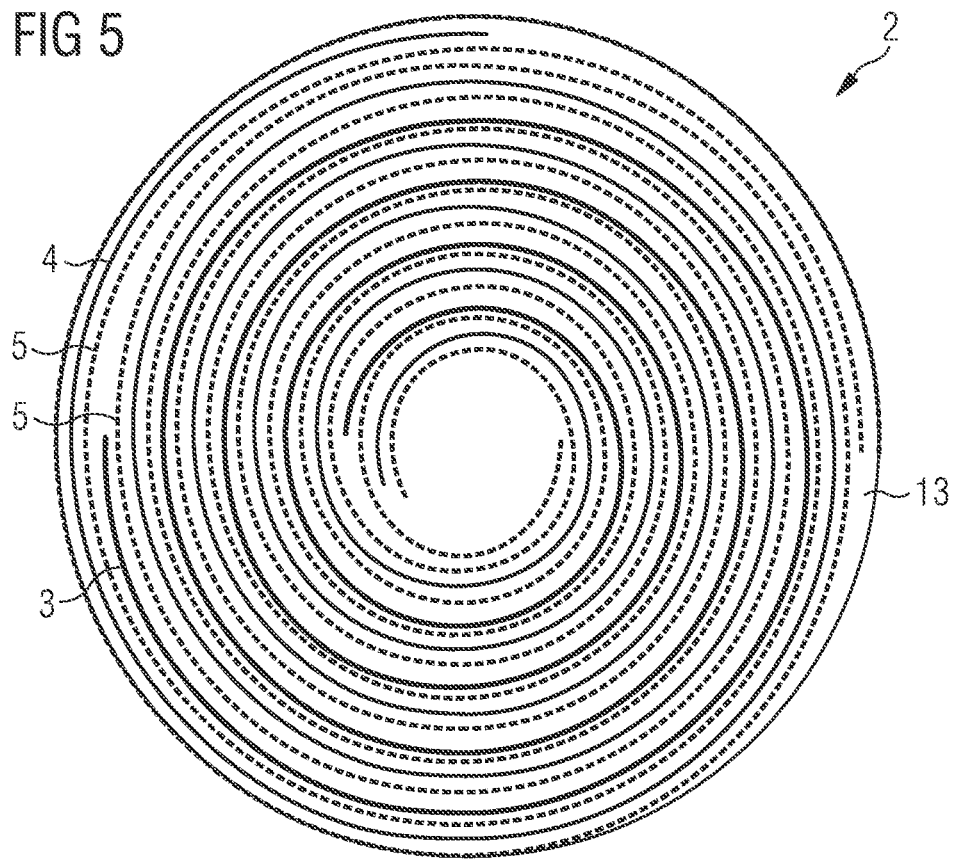
FIG. 5 shows a schematic cross-sectional view of a hybrid aluminum polymer electrolytic capacitor without lead tabs.

FIG. 5 shows a schematic cross-sectional view of the hybrid polymer aluminum electrolytic capacitor 1. The capacitor 1 comprises the anode foil 3, the cathode foil 4, a first separator 5 and a second separator 5. Moreover, the capacitor 1 comprises a liquid electrolyte 13 which fills the gaps between the anode foil 3, the cathode foil 4 and the separators 5.

The anode foil 3 is shorter than the cathode foil 4. Thus, at the beginning of its winding and at the end of its winding, the winding element 2 does not comprise the anode foil 3. In every part of the winding element 2, the cathode foil 4 is always parallel to the anode foil 3. The winding element 2 does not comprise a region wherein the anode foil 3 is free from the cathode foil 4. The winding element 2 does not comprise a polymer region that is in contact with the anode foil 3 and not in contact with the cathode foil 4. The anode foil 3 and the cathode foil 4 are arranged and dimensioned such that, in the winding element 2, every part of the anode foil 3 is covered by the cathode foil 4.

Thus, it can be ensured that the capacitor 1 does not comprise a polymer region wherein the potential applied to the anode foil 3 can dominate the potential in an adjacent polymer region. Accordingly, no compensation current can be generated. The arrangement of the cathode foil 4 ensures that the polymer and the electrolyte 13 have more or less the same electrical potential. The failure mechanism discussed with respect to FIG. 4 can be avoided.

Moreover, an inhomogeneous thickness of the oxide layer on the cathode foil 4 can also result in compensation currents during charging and discharging of the capacitor 1. To avoid the generation of the compensation current, the oxide layer on the cathode foil 4 has a homogeneous thickness. Thus, the thickness of the oxide layer is considered as being homogeneous when its minimum thickness is not thinner than 95% of its maximum thickness.

The homogeneous oxide thickness on the cathode foil 4 further increases the robustness against transient electrical loads. This can be achieved by using cathode foils 4 formed to a voltage level of, e.g., 3 V or more, instead of applying unformed foils having a lower and naturally varying oxide thickness.

In the following, the method of impregnating the winding element 2 with a polymer dispersion is described. The winding element 2 is wound before the step of impregnating the winding element 2.

Figure 6:
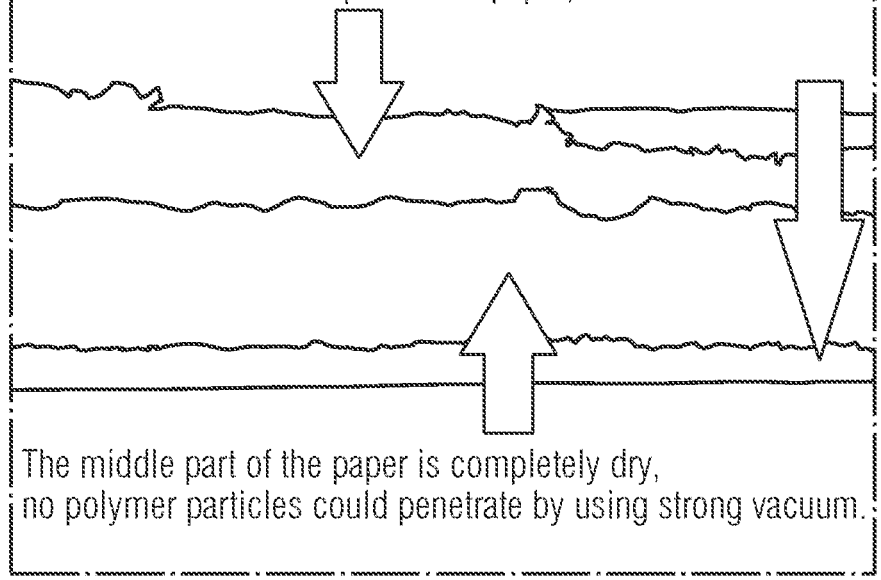
FIG. 6 shows an example of a polymer dispersion being applied to a winding element using a conventional impregnation method.

The polymer dispersion comprises electrically conductive solid polymer particles or a polymer powder. Additionally, the polymer dispersion comprises a solvent, e.g., water. In the prior art, methods of impregnating a winding element 2 with a polymer dispersion are known wherein the polymer dispersion is applied under vacuum conditions. As previously discussed, this method has technical limitations in terms of the height of the winding element 2. FIG. 6 shows an example of a polymer dispersion being applied to a winding element 2 with a height larger than 10 mm using a conventional impregnation method. FIG. 6 clearly shows that the polymer solution penetrates only on upper and bottom parts of the separator, anode foil and cathode foil. The middle part of the separator is completely free from polymer as the polymer particle could not penetrate by using a strong vacuum.

In contrast to this, according to embodiments of the present invention, the winding element 2 may be impregnated with a polymer dispersion using pressure pulses of an overpressure. The winding element 2 is arranged in a pressure vessel which is closed tightly. The vessel is flooded by a polymer dispersion through a joint. An overpressure air is applied to the vessel through the joint. The overpressure air may have a pressure larger than 1 atm. The overpressure may be in the range of 2 to 150 bar. The overpressure is released after a few seconds, e.g., after a time period in the range of 2 seconds to 20 seconds. Then, the pressure in the vessel drops to lower pressure. The lower pressure may either be an atmospheric pressure or a pressure below 1 bar. The cycle of applying an overpressure followed by applying lower pressure is considered as one pressure pulse. The cycle is repeated multiple times. By applying pressure pulses to the winding element and the polymer dispersion, the polymer dispersion is distributed in a homogenized way in the anode foil 3, the separator 5 and the cathode foil 4.

Figure 7:
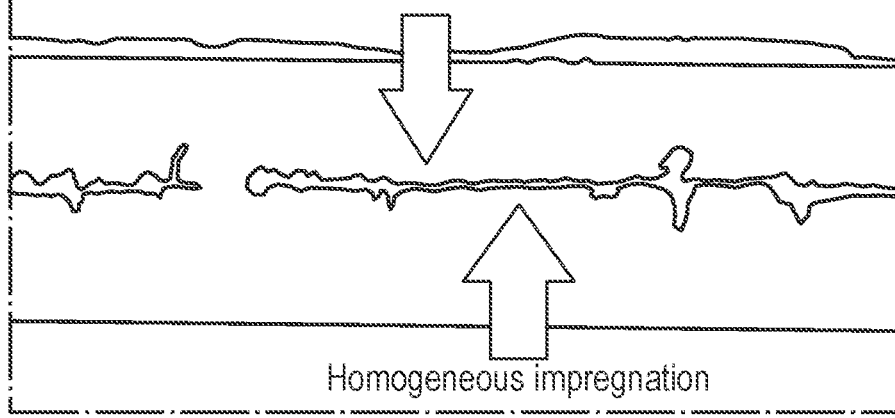
FIG. 7 shows a detailed photograph of a winding element which has been impregnated with the new method.

FIG. 7 shows a detailed photograph of an anode foil 3, a separator 5 and a cathode foil 4 which have been impregnated with the help of pressure pulses. The polymer particle has reached the core of the separator 5. Penetration of the polymer particles into the winding element 2 and the homogeneity of the polymer distribution are excellent.

In an alternative method, the winding elements 2 are arranged in a tube and the tube is filled with the polymer dispersion which flows through the tube and thereby through the winding elements 2. Moreover, an overpressure of more than 1.5 bar may be applied to the polymer dispersion. This method also results in a homogenous covering of the anode foil 3, the separator 5, the cathode foil 4 and the tabs 7, 8 with the polymer. In particular, the polymer dispersion enters on the bottom or on the top of the winding element 2 and flows through the winding element 2 in the axial direction. The method can be designed such that the polymer dispersion is circulated and thus flows through the winding element 2 multiple times, each time further improving the impregnation of the winding element 2.

The above described methods for impregnating the winding element 2 enable a homogeneous impregnation of winding elements 2 having a diameter of more than 10 mm and a height of more than 12 mm.

The hybrid polymer aluminum electrolytic capacitor described above has the following advantages. Even at diameter dimensions at more than 10 mm it provides a low ESR and therefore a high ripple current ability. As the capacitor has a height of more than 12 mm, it has a low ESR. Further, the diameter of more than 10 mm and the height of more than 12 mm result in a high capacity. The low ESR and the large dimensions further result in a high ripple current ability. Even in the case of high voltage ripple loads, a high quality can be ensured. Thus, a customer can use a lower number of big capacitors instead of using a bigger number of small capacitors. The lifetime of the hybrid polymer aluminum electrolytic capacitor is long due to its big dimensions. The capacitor has a large reservoir of liquid electrolytic which therefore escapes more slowly by diffusion through the rubber and can materials.

Figure 8:
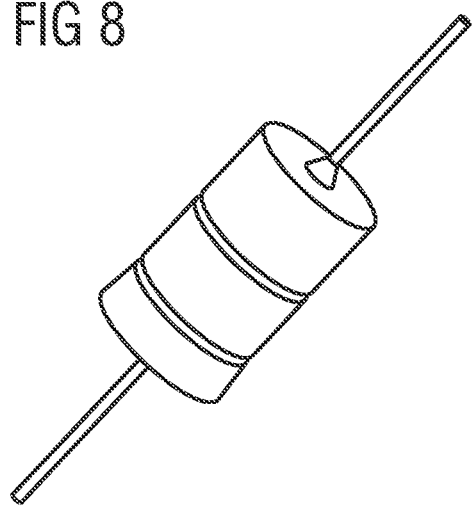
FIGS. 8 to 12 show different kinds of capacitor elements.
Figure 9:
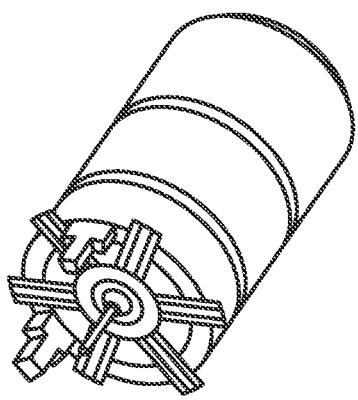
Figure 10:
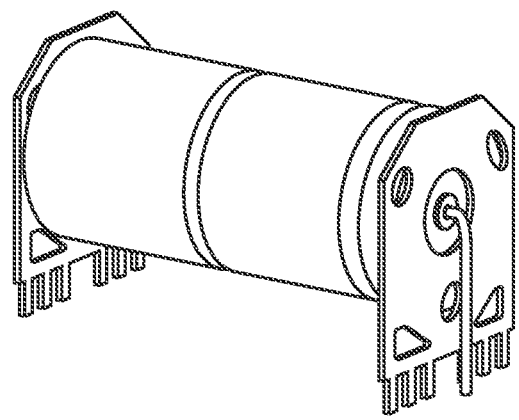
Figure 11:
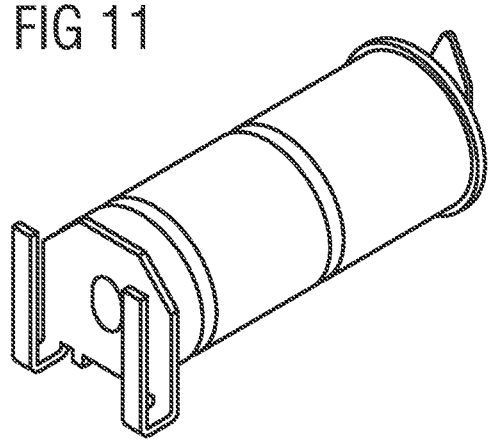
Figure 12:
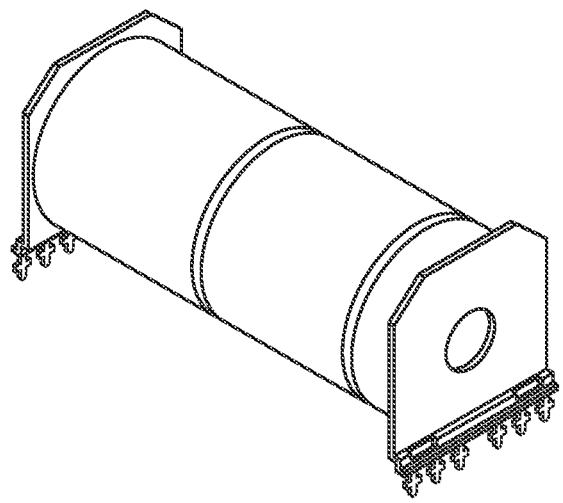

FIGS. 8 to 12 show different designs of the capacitor comprising a winding element having a diameter of more than 10 mm and a length of more than 12 mm. Each of the capacitors shown in FIGS. 8 to 12 is a hybrid polymer aluminum electrolytic capacitor. FIG. 8 shows an axial capacitor. It is configured for soldering or welding conducting. FIG. 9 shows a soldering star capacitor. A soldering star capacitor provides the advantage of a low inductance. FIG. 10 shows a flat horizontal soldering star capacitor. FIG. 11 shows a surface-mountable capacitor. FIG. 12 shows a press-fit version of either the capacitor shown in FIG. 9 or the capacitor shown in FIG. 10.

What is claimed is:

1. A capacitor comprising:
   a first winding element comprising an anode foil, separators and a cathode foil which are wound around an axis and which are covered by a conductive polymer, wherein the first winding element comprises a liquid electrolyte; and
   a second winding element comprising an anode foil, separators and a cathode foil which are wound around an axis and which are covered by a conductive polymer, wherein the second winding element comprises a liquid electrolyte,
   wherein each winding element has a height of more than 12 mm,
   wherein the first and second winding elements are arranged in a common can,
   wherein each winding element comprises a tab connected to a respective anode foil and a tab connected to a respective cathode foil,
   wherein the tabs connected to the anode foils are connected to each other and the tabs connected to the cathode foils are connected to each other such that the first and second winding elements are electrically connected parallel to each other,
   wherein the respective cathode foil has a larger extent in a direction of the height of the respective winding element than the respective anode foil and a number of windings of the respective cathode foil is at least by one larger than a number of windings of the respective anode foil,
   wherein the anode foils and the cathode foils are arranged and dimensioned such that, in the winding elements, the respective anode foil is embedded completely between the respective cathode foil on both sides, and
   wherein the capacitor is a hybrid polymer aluminum electrolytic capacitor.

2. The capacitor according to claim 1,
   wherein each winding element is a radial winding element, or
   wherein each winding element is an axial winding element.

3. The capacitor according to claim 1, wherein the anode foils and the cathode foils are arranged and dimensioned such that a respective anode foil is embedded completely between a respective cathode foil on both sides in a respective winding element.

4. The capacitor according to claim 1, wherein the cathode foils have a larger extent in a direction of a height of the winding elements than the anode foils.

5. The capacitor according to claim 1, wherein each cathode foil comprises an aluminum foil covered with an oxide layer, and wherein the oxide layer has a homogeneous thickness on the cathode foil.

6. The capacitor according to claim 1,
   wherein the can has a can bottom,
   wherein the cathode foils have a larger extent in an axial direction towards the can bottom than the anode foils, and
   wherein the cathode foils are electrically contacted with the can bottom.

7. The capacitor according to claim 6, wherein the can bottom comprises a structure configured to mechanically impede a movement of the winding elements relative to the can bottom.

8. The capacitor according to claim 6, wherein the cathode foils are welded to the can bottom.

9. The capacitor according to claim 6, wherein the can comprises a corrugation which fixes the winding elements.

10. The capacitor according to claim 6,
    wherein the can comprises a cover,
    wherein the anode foils have a larger extent in the axial direction towards the cover than the cathode foils, and
    wherein the anode foils are electrically contacted to the cover.

11. The capacitor according to claim 10, wherein the anode foils are welded to the cover.

12. The capacitor according to claim 1, wherein each winding element has a diameter of less than 22 mm.

13. The capacitor according to claim 1, wherein a ratio of a height of each winding element to a diameter of a respective winding element is larger than 2.

14. A capacitor comprising:
    a winding element having a diameter of more than 10 mm;
    at least two tabs electrically contacted with an anode foil; and
    at least two tabs electrically contacted with a cathode foil,
    wherein the cathode foil has a larger extent in a direction of a height of the winding element than the anode foil and a number of windings of the cathode foil is at least by one larger than a number of windings of the anode foil,
    wherein the anode foil and the cathode foil are arranged and dimensioned such that, in the winding element, the anode foil is embedded completely between the cathode foil on both sides, and
    wherein the capacitor is a hybrid polymer aluminum electrolytic capacitor.

15. The capacitor according to claim 14, wherein each cathode foil comprises an aluminum foil covered with an oxide layer, and wherein the oxide layer has a homogeneous thickness on the cathode foil.

16. The capacitor according to claim 14, further comprising:
- a can with a can bottom,
  wherein the cathode foils have a larger extent in an axial direction towards the can bottom than the anode foils, and
  wherein the cathode foils are electrically contacted with the can bottom.

17. The capacitor according to claim 16, wherein the can bottom comprises a structure configured to mechanically impede a movement of the winding elements relative to the can bottom.

18. The capacitor according to claim 16, wherein the cathode foils are welded to the can bottom.

19. The capacitor according to claim 16, wherein the can comprises a corrugation which fixes the winding elements.

20. The capacitor according to claim 14, wherein each winding element has a diameter of less than 22 mm.

* * * * *

UNITED STATES PATENT AND TRADEMARK OFFICE
CERTIFICATE OF CORRECTION

PATENT NO. : 11,942,280 B2  
APPLICATION NO. : 17/482130  
DATED : March 26, 2024  
INVENTOR(S) : Will et al.

Page 1 of 1

It is certified that error appears in the above-identified patent and that said Letters Patent is hereby corrected as shown below:

On the Title Page

Item [62] and continued on Page 2, under "Related U.S. Application Data", Lines 1-2, delete "filed on Jun. 7, 2019, now Pat. No. 11,158,464, which is a division of application no. PCT/EP2017/083574, filed on Dec. 19, 2017." and insert -- filed as application no. PCT/EP2017/083574 on Dec. 19, 2017, now Pat. No. 11,158,464. --.

Signed and Sealed this  
Fourteenth Day of May, 2024

Katherine Kelly Vidal  
*Director of the United States Patent and Trademark Office*